(12) United States Patent
Larson et al.

(10) Patent No.: US 7,437,623 B2
(45) Date of Patent: Oct. 14, 2008

(54) APPARATUS AND METHOD FOR PERFORMING SPECULATIVE READS FROM A SCAN CONTROL UNIT USING FIFO BUFFER UNITS

(75) Inventors: Lee A. Larson, Katy, TX (US); Henry R. Hoar, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 541 days.

(21) Appl. No.: 10/942,574

(22) Filed: Sep. 16, 2004

(65) Prior Publication Data

US 2005/0120269 A1 Jun. 2, 2005

Related U.S. Application Data

(60) Provisional application No. 60/517,536, filed on Nov. 5, 2003.

(51) Int. Cl.
*G06F 11/00* (2006.01)
(52) U.S. Cl. ...................................................... 714/56
(58) Field of Classification Search .................. 714/30, 714/56, 726; 712/227
See application file for complete search history.

(56) References Cited

U.S. PATENT DOCUMENTS

| | | | | |
|---|---|---|---|---|
| 5,479,652 A | * | 12/1995 | Dreyer et al. ................. 714/30 |
| 5,488,688 A | * | 1/1996 | Gonzales et al. ............... 714/34 |
| 5,625,785 A | * | 4/1997 | Miura et al. ................. 712/227 |
| 5,828,824 A | * | 10/1998 | Swoboda ...................... 714/25 |
| 6,055,649 A | * | 4/2000 | Deao et al. .................... 714/30 |
| 6,314,530 B1 | * | 11/2001 | Mann ........................... 714/38 |
| 6,546,505 B1 | * | 4/2003 | Swoboda et al. .............. 714/30 |
| 6,687,865 B1 | * | 2/2004 | Dervisoglu et al. ......... 714/726 |
| 6,889,344 B2 | * | 5/2005 | Williams ...................... 714/43 |
| 7,017,081 B2 | * | 3/2006 | Gomez ......................... 714/30 |
| 7,051,197 B2 | * | 5/2006 | Agarwala et al. .............. 713/2 |
| 7,100,086 B1 | * | 8/2006 | Kudo et al. ................... 714/30 |
| 7,149,926 B2 | * | 12/2006 | Ahmad et al. ................. 714/30 |
| 7,231,551 B1 | * | 6/2007 | Treue et al. ................... 714/30 |
| 7,237,090 B1 | * | 6/2007 | Hudepohl et al. ............. 712/34 |
| 7,401,257 B2 | * | 7/2008 | Usui ........................... 714/27 |

* cited by examiner

*Primary Examiner*—Bryce P. Bonzo
*Assistant Examiner*—Amine Riad
(74) *Attorney, Agent, or Firm*—Frederick J. Telecky, Jr.; Wade J. Brady, III

(57) ABSTRACT

A method for debugging a target processor is provided that includes storing a plurality of data values to be sent to the target processor in a first-in first-out (FIFO) buffer unit, saving a copy of an address in a read address counter of the FIFO buffer unit, wherein the address is that of an initial data value of a sequential portion of the plurality of data values, performing a transfer operation to send the sequential portion to the target processor, wherein the read address counter is incremented as each data value is sent. The method also includes resetting the read address counter with the copy of the address if the transfer operation fails and performing the transfer operation again.

18 Claims, 4 Drawing Sheets

APPARATUS AND METHOD FOR PERFORMING SPECULATIVE READS FROM A SCAN CONTROL UNIT USING FIFO BUFFER UNITS

This application claims priority under 35 USC §119(e) (1) of Provisional Application No. 60/517,536 (TI-37248P) filed Nov. 5, 2003.

FIELD OF THE INVENTION

This invention relates generally to the use of emulation units to perform test and debugging operations on a digital signal processor target system and, more particularly, to providing a method for optimizing JTAG (Joint Test Action Group) transfers between a test and debug unit and target processor. The present invention improves the performance of the test and debug unit in boundary scans.

BACKGROUND OF THE INVENTION

In the past, test and debug procedures on digital signal processors was done using a scan control unit that converts parallel information from a test and debug unit into a serial data stream. The data values to be scanned out needed to be loaded each time a scan was executed, unless all of the data values were identical.

In a high performance scan controller, the number of times the test and debug unit must load the registers in the scan control unit can become a limiting factor of the performance of the testing procedure. This problem is compounded by the increasing speed of the test clock, which is the speed at which data is serialized and sent to the target processor.

There are two efficiency factors that govern the performance of a test and debug system. These factors are the inherent efficiency of the target processor itself, and the efficiency of the scan control unit. The efficiency of the target processor relates to how many bits of information and control signals must be sent to the target processing unit to perform an operation such as a single step operation, memory access operation, or register access operation. This factor is ignored by this invention since the digital signal processor efficiency cannot be altered by the scan control unit implementation.

The efficiency of the scan control unit relates to how many bits must be loaded into the scan control unit to cause it to send out the required number of bits for the digital signal processor to perform an operation with no dead time between operations. For certain types of operations, the information to be scanned out consists of a fixed value, possibly an opcode, and a variable value, possibly and address or data value.

If a scan control unit has a 16-bit interface with the test and debug unit, and the test clock rate is 32 MHz, the scan control unit must be provided with a data value every 500 ns in order to run at 100% efficiency. In addition, the test and debug unit must load control information into the scan control unit to control the scans and the target processor JTAG interface, as well as access status from the scan control unit related to the scan operations. If the scan control unit access time and test and debug unit memory access times are on the order of 100 ns, then 40% of the bus bandwidth is consumed just by data transfers to the target signal processor. If the target processor is also returning information, then data transfers will be consuming 80% of the bus bandwidth. If the test and debug unit must access the scan controller to determine if a data value can be loaded or read, the remaining 20% of the bus bandwidth is used up, leaving no time for loading control information into the scan controller, or execution of instructions by the test and debug unit.

These limitations can be addressed in 3 ways, widen the data path between the test and debug unit and the scan control unit and memory, reduce the access time, and reduce the number of times the scan control unit must be accessed. Widening the data path requires additional pins on the scan controller device, the debug unit and the memory, and may not always be possible. Reducing the access time of the scan control unit or memory might be possible, but is limited by the particular implementation of both. Reducing the number of accesses of the scan control unit provides a means of improving the efficiency, which can be applied in conjunction with the other two techniques.

Referring to FIG. 1, a block diagram of a test and debug system capable of advantageously using the present invention is shown. The test and debug system includes a user interface 5, a test and debug unit 10, and a target processor 15. The user interface 5 includes the apparatus that permits a user to interact with, and control the testing of, the target processing unit 15. The user interface 5 can include display apparatus, input apparatus such as a keyboard, etc. for initiating test and debug procedures and for receiving the results of these procedures. The user interface 5 is coupled to the test and debug unit 10 through interface unit 101. The interface unit 101 exchanges signals with the processing unit 102 of the test and debug unit 10. The processing unit 102 applies signals to and receives signals from the scan control unit 103. The scan control unit 103 includes a local processor 1031, and memory unit out 1032 for exchanging signals with the local processor 1031, a memory unit in 1035 for storing signals from the target processing unit 15, a shift register out 1034 and a shift register in 1033, the shift registers 1033 and 1034 transferring data in and out of the test and debug unit 10 under control of the local processor 1031. For purposes of the present invention, the processing unit 102 provides commands to the scan control unit 103 and supplies the contents of the memory unit 1032. The target processing unit 15 includes a test access port 151, a shift register 152, an instruction register 153, a data register 154, a mini-status register 155 and a data register 156. The test access port 151 is a state machine responsive to test mode select (TMS) signals from the processing unit 102 for controlling the JTAG apparatus in the target processing unit 15. The shift register 152 receives signals from the shift register out 1034 and transfers signals to the shift register in 1033. The shift register 152 applies signals to the instruction register 153 and with the data register 154 and receives signals from the mini-status register 155 and the data register 156.

Referring to FIG. 2, a portion of the contents of the memory unit out 1032, according to the prior art, is illustrated. In particular, the memory unit out 1032 includes a command parameter section 1032A. Examples of the parameters included in the command parameter section are parameters defining a JTAG scan length and parameters defining JTAG end states. A command from the processing unit 102 will include reference to these parameters and these parameters will be accessed and appropriate control signals applied to the test access port 151 by the local processor.

Referring to FIG. 3, the execution of a command is illustrated. When command A is issued, the command active signal is activated. The command active signal allows the go to shift state function, the send/receive function, and the go to end state to be executed by the scan control unit 103. When the command active signal is no longer active, then a next command B can be executed. If a command C is issued while the target processor is still executing command A, command C will fail and be must retried.

In the past, configurations employing a JTAG emulation unit to test and debug a digital signal processor have had to issue a transaction, such as a read memory command, and then issue additional commands to retrieve the data or to determine if the original transaction was successful. The delay between the commands was usually sufficient to allow the target system the opportunity to complete the transaction. Transactions are usually initiated when the JTAG state (machine) transitions through "Update IR" to "Idle" or Pause. (The state diagram for the JTAG test and debug procedure is shown in FIG. 4. The four stable, non-shift JTAG states are indicated in this Figure as states 41, 42, 43 and 44.) New transactions are initiated by entering the "Scan" state. When the target system does not respond in a timely manner, the transaction will fail, and the test and debug unit 10 must retry the transaction. The transaction retries impact the performance of the test and debug configuration and, in the situation involving large data transfers with many retries, can result in a significant degradation of the configuration performance.

When dealing with large, variable amounts of data, registers become impractical. RAMs and FIFOs are well suited to handle large amounts of data. Using RAMs for data storage requires logic to generate addresses and keep track of when the RAMs are full, and what RAM locations contain valid data. Using FIFOs addresses these two RAM issues, but presents others. The problem with using a FIFO is the data gets "consumed" when it is read, it can only be read once. And once data is written to a FIFO, it cannot be "unwritten".

When a test and debug unit is used to test a target processing unit, scan operations can sometimes fail. They can fail for a variety of reasons, such as the target processing unit has inhibited emulator access during critical sections of code execution, the test and debug system can have insufficient priority to access memory, or the memory system may simply be busy. If a scan control unit is using a FIFO unit for data storage, these failures can result in loss of data or invalid data values being returned.

A need has been felt for apparatus and an associated method having the feature of being able to increase the rate of transfer of information from a test and debug unit to a target processing unit. It would be another feature of the apparatus and associated method to provide an improved put buffer unit for transferring data to a target processing unit. It would be yet another feature of the apparatus and associated method to provide retransmit of signal groups to the target processing unit when a transfer fails. It is a more particular object of the present invention to maintain a signal group in the put buffer unit until a successful transfer of the signal group has taken place. It would be still another feature of the apparatus and associated method to provide signals indicative of the unused capacity of the put buffer memory unit. It is yet another feature of the apparatus and associated method to synchronize the transfer of data from the scan control unit to the target processor.

SUMMARY OF THE INVENTION

The aforementioned features are accomplished, according to the present invention, by providing a put buffer unit in the scan control unit. The put buffer unit receives data signal groups from the test and debug processing unit and transfers these groups through the scan control unit to the target processing unit. The put buffer unit transfers the data signal groups to the target processing unit, but retains a copy of the data signal groups. If the transfer to the target processing unit fails, the put buffer unit can resend the data signal group until a successful transfer is achieved. The put buffer unit is synchronized with the target processing unit clock. In addition, the put buffer unit provides signals indicative of the remaining storage space in the unit to prevent attempts by the test and debug unit to store data signal groups when insufficient storage space is available.

Other features and advantages of present invention will be more clearly understood upon reading of the following description and the accompanying drawings and the claims.

BRIEF DESCRIPTION OF THE DRAWINGS

FIG. 5A illustrates the structure of the memory unit out of the scan control unit according to the present invention, while FIG. 5B illustrates the structure of a command applied to the scan control unit to provide the memory unit out access according to the present invention.

DESCRIPTION OF THE PREFERRED EMBODIMENT

1. Detailed Description of the Figures

FIGS. 1, 2, 3, and 4 have been described with respect to the related art.

Figure 1:
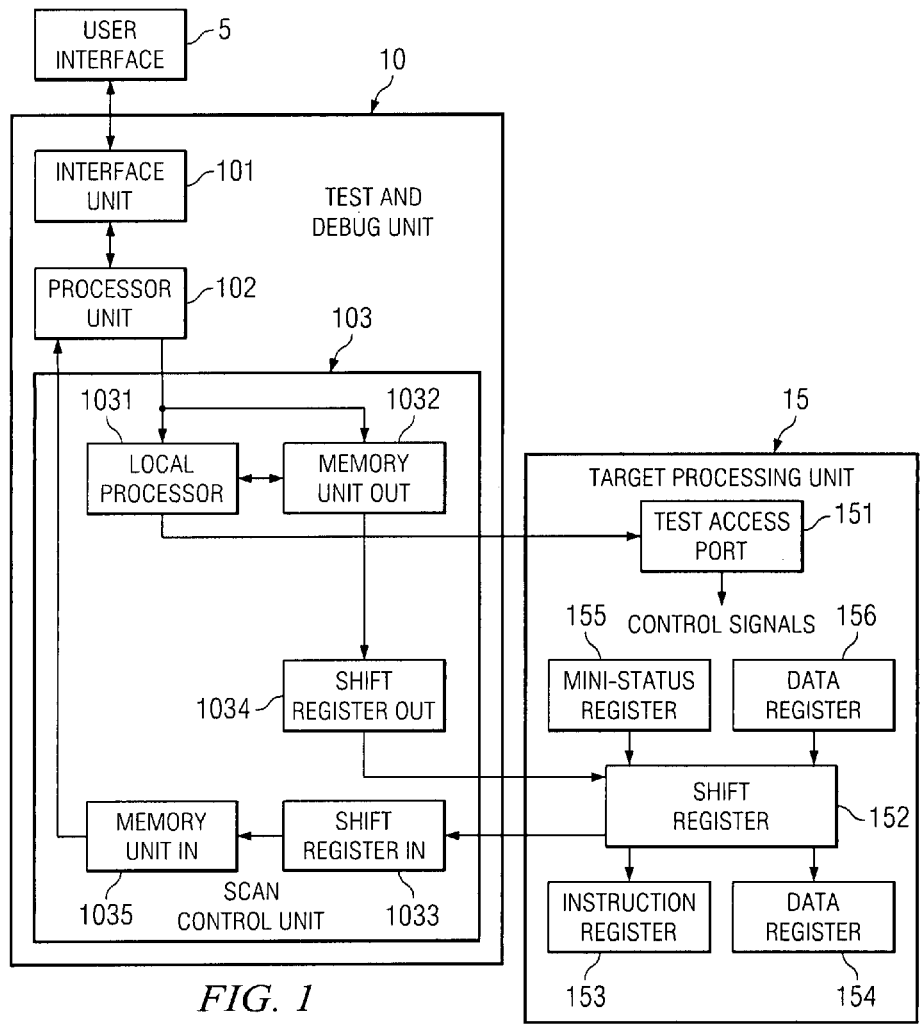
FIG. 1 is a block diagram of prior art test and debug apparatus capable of advantageously using the present invention.
Figure 2:
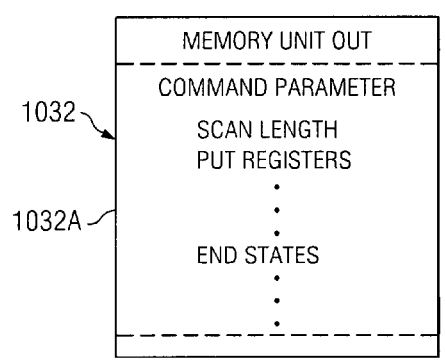
FIG. 2 illustrates the contents of the scan controller memory unit according to the prior art.
Figure 3:
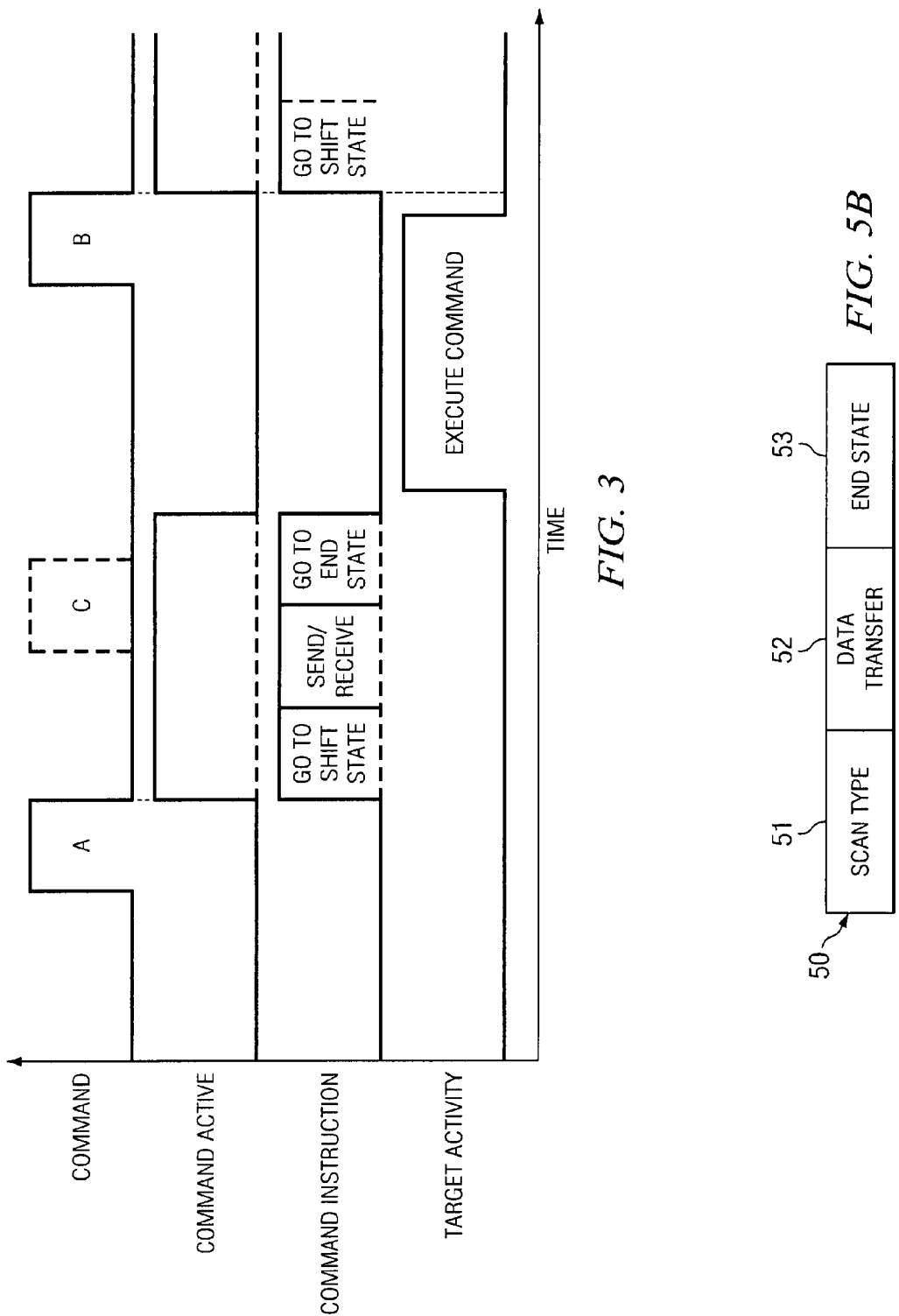
FIG. 3 illustrates the execution of a command in the JTAG test and debug environment according to the prior art.
Figure 4:
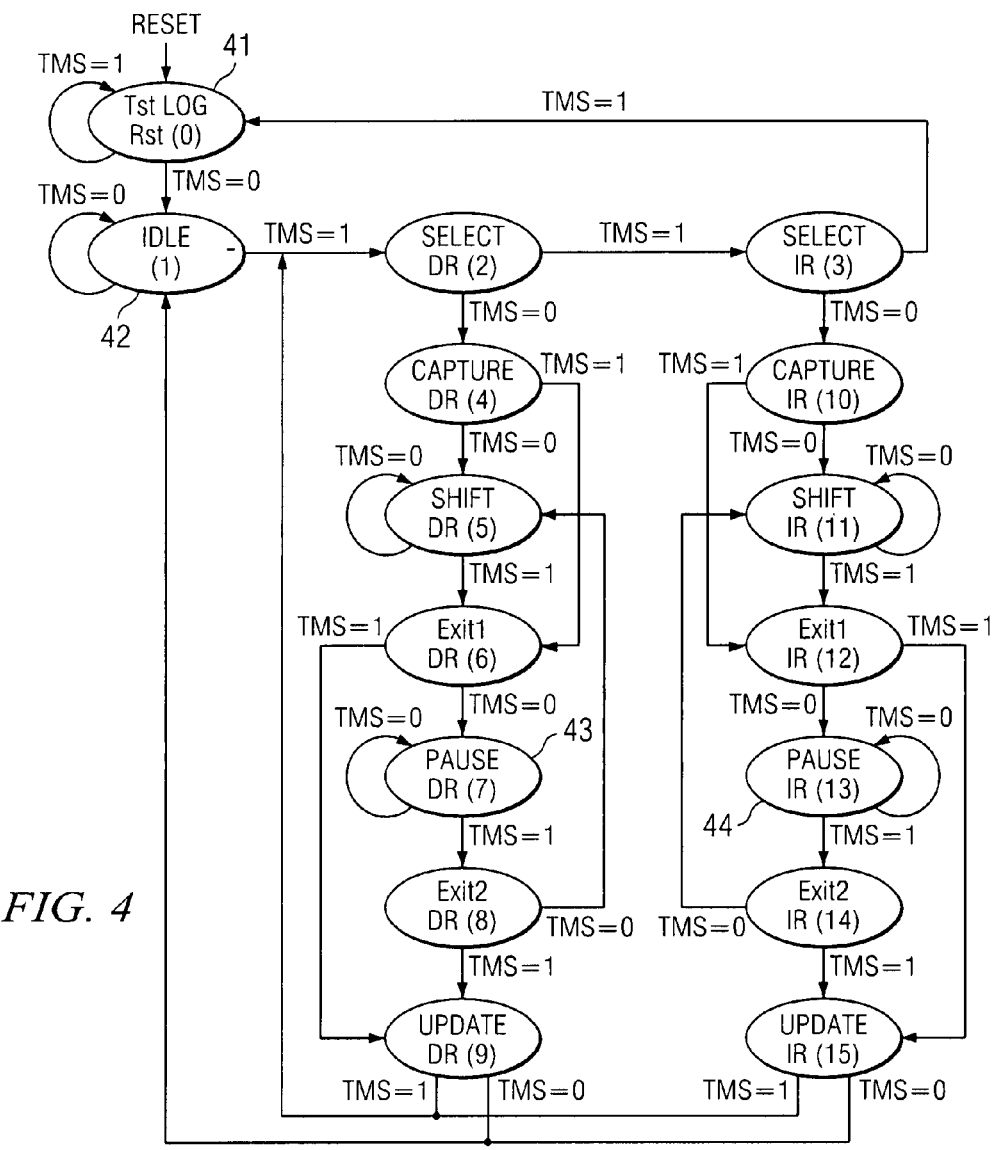
FIG. 4 is a JTAG state diagram according to the prior art.
Figure 5A:
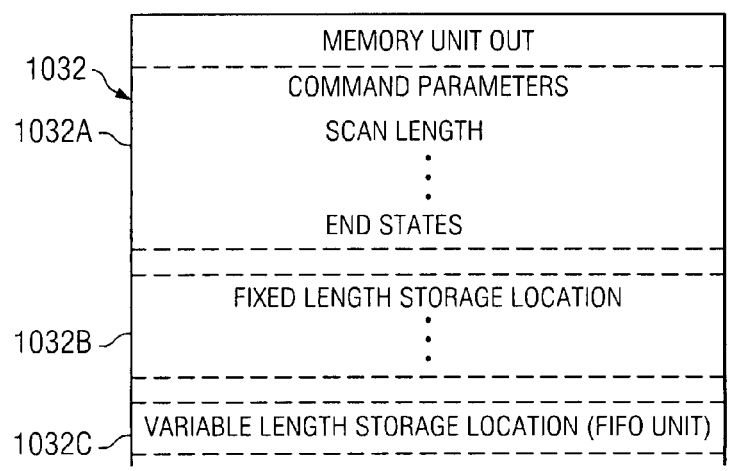

Referring next to FIG. 5A, the structure of the memory unit out 1032 according to present invention is shown. The memory unit out 1032 includes command parameter storage locations 1032A. The command parameter storage locations 1032A are storage location scan lengths and end states, states that must be communicated to the target processing unit. In storage locations 1032B, the fixed length signal groups to be transferred to the target processing unit. In the storage locations 1032C, the signal groups are stored that have a variable length. In the preferred embodiment, these storage locations are implemented by a FIFO (first-in first-out) memory unit.

Referring to FIG. 5B, the structure of a command applied to the scan control unit 103 from the test and debug processing unit is shown. The command 50 includes, for purposes of this discussion, three parameters. In the preferred embodiment, the parameters represent storage locations in the memory unit out 1032. The local processor 1031 will retrieve the fields at the indicated storage locations and implement the data transfers in an appropriate manner. The scan type parameter 51 and the end state parameter 53 designate storage locations that store JTAG states and scan lengths illustrated in FIG. 4. These JTAG states are communicated by the scan control unit 103 to the target processing unit 15. The data transfer parameter 62 designates whether the data transfer to the target processing unit 15 is a fixed mode transfer, a variable mode transfer, or a mixed mode transfer. The data transfer parameter 52 causes the scan control unit to implement the appropriate transfer mode at the designated locations.

Figure 6:
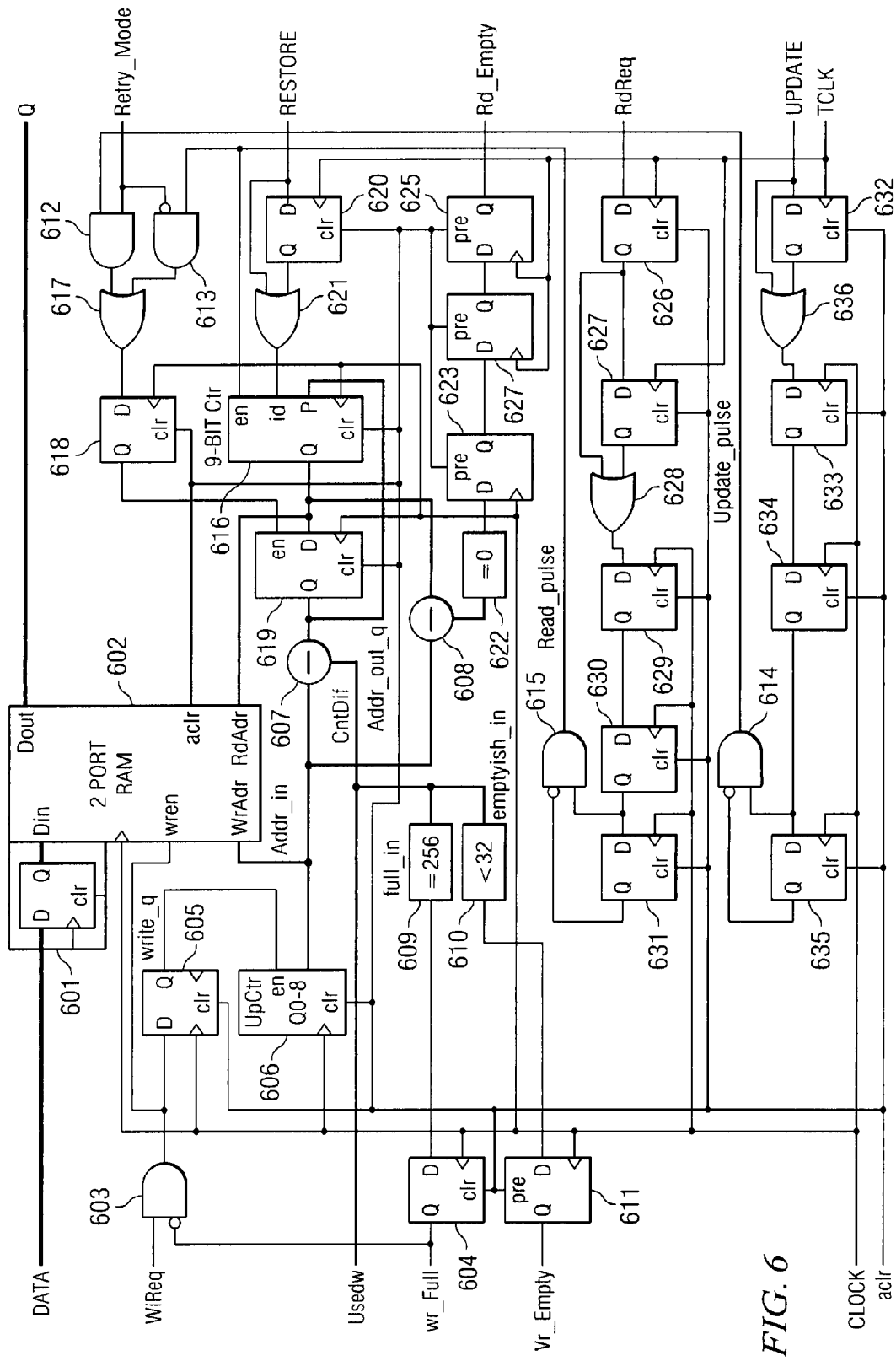
FIG. 6 is a block diagram of a put buffer unit in a scan control unit according to the present invention.

Referring next to FIG. 6, a schematic block diagram for a put buffer unit is shown. A DATA signal is applied to the D terminal of a D flip-flop 601. The Q terminal of the D flip-flop is coupled to the Din terminal of 2 port RAM 602. The Q signal is applied to the D out terminal of 2 port RAM 602. A WRREQ signal (WiReq in FIG. 6) is applied to a first terminal of logic AND gate 603. A WR_FULL signal applied to the Q terminal of D flip-flop 604 is applied to an inverting terminal of logic AND gate 603. The output terminal of logic AND gate 603 is coupled to the D terminal of D flip-flop 605 and to the Wren terminal of 2 port RAM 602. The Q terminal of D flip-flop 605 is coupled to the En terminal of up-counter 606. An input terminal of subtractor 607 is coupled to the Q (0-8) terminal of up-counter 606, to the WrAdr terminal of 2 port RAM 602, and to an input terminal of subtractor 608. The USEDW signal is applied to the output terminal of subtractor 607, to an input terminal of =256 comparator 609, and to an input terminal of <32 comparator 610. The output terminal of =256 comparator 609 is coupled to the D terminal of D flip-flop 604. The output terminal of <32 comparator 610 is applied to the D terminal of D flip-flop 611. The Q terminal of D flip-flop 611 provides the ALM_EMPTY signal (Vr Empty in FIG. 6). The RETRY_MODE signal is applied to a first terminal of logic AND gate 612 and to an inverting terminal of logic AND gate 613. The second input terminal of logic AND gate 612 is coupled to the output terminal of logic AND gate 614 (i.e., the UPDATE_PULSE signal). The second input terminal of logic AND gate 613 is coupled to an output terminal of logic AND gate and to the EN terminal of 9 bit counter 616. The output terminal of logic AND gate 612 is coupled to a first terminal of logic OR gate 617, while the output terminal of logic AND gate 613 is coupled to the second input terminal of logic OR gate 617. The output terminal of logic OR gate 617 is coupled to the D terminal of D flip-flop 618. The Q terminal of D flip-flop 618 is coupled to the En terminal of D register 619. The RESTORE signal is applied to the D terminal of D flip-flop 620 and to a first input terminal of logic OR gate 621. The Q terminal of D flip-flop 620 is coupled to a second input terminal of logic OR gate 621. The output terminal of logic OR gate 621 is coupled to the Ld terminal of counter 616. The Q terminal of D register 619 is coupled to an input terminal of subtractor 607 and to the P terminal of counter 616. The Q terminal of counter 616 is coupled to the D terminal of D flip-flop 619, to a second input terminal of subtractor 608, and to the RdAdr terminal of RAM 602. The output terminal of subtractor 608 is coupled to =0 comparator 622. The output terminal of =0 comparator 622 is coupled to the D terminal of D flip-flop 623. The Q terminal of D flip-flop 623 is coupled to the D terminal of D flip-flop 624. The Q terminal of d flip-flop 624 is coupled to the D terminal of D flip-flop 625. The Q terminal of D flip-flop 625 provides the RD_EMPTY signal. The RDREQ signal is applied to the D terminal of D flip-flop 626. The Q terminal of D flip-flop 626 is applied to the D terminal of D flip-flop 627 and to a first terminal of logic OR gate 628. The Q terminal of D flip-flop 627 is applied to a second input terminal of logic OR gate 628. The output terminal of logic OR gate is coupled to the D terminal of D flip flop 629. The Q terminal of D flip-flop 629 is coupled to the D terminal of flip-flop 630. The Q terminal of D flip-flop 630 is coupled to the D terminal of D flip-flop 631 and to a first input terminal of logic AND gate 615. The Q terminal of D flip-flop 631 is coupled to an inverting terminal of logic AND gate 615. The UPDATE signal is coupled to the D terminal of D flip-flop 632 and to a first input terminal of logic OR gate 636. The Q terminal of D flip-flop 632 is coupled to the second input terminal of logic OR gate 636. The output terminal of logic OR gate 636 is coupled to the D terminal of D flip-flop 633. The Q terminal of D flip-flop 633 is coupled to the D terminal of D flip-flop 634. The Q terminal of D flip-flop 634 is coupled to the D terminal of the D flip-flop 635 and to a first input terminal of logic AND gate 635. The Q terminal of D flip-flop 635 is coupled to an inverting terminal of logic AND gate 614. The TCLK signal is applied to the clock terminals of the D flip-flop 632, to the clock terminals of D flip-flops 626 and 627, to the clock terminals of D flip-flops 625 and 626, and the clock terminal of D flip-flop 620. The CLOCK signal is applied to the clock terminals of the remaining components. The ACLR signal is applied to the Clr or Pre terminals of the components.

2. Operation of the Preferred Embodiment

Referring to FIG. 6, the put buffer unit, according to the present invention, is illustrated. The test and debug processing unit loads data into the put buffer by applying data to the input and asserting the WRREQ signal for 1 clock. The data and write request are latched and the data is synchronously written into the 2 port RAM unit. The write address is also incremented.

The write address is compared to the latched read address and the difference can be read by the debug processor to determine if there is any more room in the put buffer unit. The count difference is also compared to two thresholds, 32 and 256. If the buffer contains 256 values, the WR_FULL signal is asserted and inhibits any further writes to the put buffer unit. If there are less than 32 words in the buffer, the ALM_EMPTY signal is asserted. This signal can be rising edge detected to generate an interrupt to the test and debug processing unit when the put buffer unit is almost empty.

The scan controller monitors the Rd_Empty status bit to determine if there is data in the buffer that can be forwarded to the target processing unit. If no data is available, the scan control unit enters the pause state until there is data. The scan control unit is assumed to be operating using the JTAG test clock (TCLK). Since this clock is different from the functional clock provided by the test and debug processing, the signals to the put buffer unit must be synchronized.

The 2 port RAM component outputs the data value continuously. The scan control unit latches the data value and then asserts RDREQ signal for one TCLK. This signal is latched and pulse stretched to 2×TCLK wide. The functional clock frequency is always higher than the TCLK frequency. Consequently, the stretched read request can be sampled without missing it. This signal is then synchronized to the functional clock and edge detected to create the READ_PULSE signal. This signal will cause the read address counter to increment and the next data value from the RAM will be read. The synchronization delay does not affect the scan control unit operation since the data value is 16-bits wide, and another read request cannot be asserted for 16 clocks.

The read counter is subtracted from the write counter, the difference is compared to zero, and difference signal is latched in the functional clock domain. The output is synchronized back to the TCLK domain and is provided as RD_EMPTY signal.

If Retry_Mode is not asserted, the read address counter value is latched and compared to the write address counter to generate the USEDW, WR_FULL and ALM_EMPTY flag signals to the test and debug processing unit. If Retry Mode is asserted, the read address counter value is not latched when a read occurs. Instead, the scan control unit reads as many values as required and determines whether the transfer operation is successful or not. If the operation is a success, the scan control unit asserts the UPDATE signal. This signal is latched, pulse stretched and synchronized to the functional clock and then edge detected to create the UPDATE_PULSE signal. This signal is used to latch the read address counter value. If the transfer operation failed, the scan control unit asserts the RESTORE signal. This signal is pulse stretched and is used to reload the read address counter with the value that was last latched.

Referring once again to FIG. 6, the implementation of the put buffer unit is shown. The put buffer unit is implemented using a 2 port RAM unit with a read counter and a write counter supplying the addresses for the RAM. Additional logic is used for synchronization, detecting the almost empty, empty, and full status, as well as the number of data values present in the RAM unit. Logic is provided for accepting or for invalidating reads from the put buffer unit.

The buffer has three unique control signals, RETRY_MODE, UPDATE and RESTORE signals. When the RETRY_MODE signal is asserted, the read counter increments on each read and the data value is read from the RAM unit, but the value used to calculate the number of words in the buffer is not updated. This value is only updated when the UPDATE signal is activated. Activating the RESTORE signal causes the read counter to load the last address value which was updated, effectively invalidating any reads which may have occurred.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A method for debugging a target processor, the method comprising:
    storing a plurality of data values to be sent to the target processor at sequential addresses in a first-in first-out (FIFO) buffer unit;
    saving a copy of an address in a read address counter of the FIFO buffer unit, wherein the address is that of an initial data value of a sequential portion of the plurality of data values;
    performing a transfer operation to send the sequential portion to the target processor, wherein the read address counter is incremented as each data value in the sequential portion is sent;
    if the transfer operation fails, resetting the read address counter with the copy of the address and performing the transfer operation again; and
    if the transfer operation succeeds, saving a copy of an address in the read address counter and performing another transfer operation to send a next sequential portion of the plurality of data values to the target processor.

2. The method of claim 1, wherein performing a transfer operation further comprises:
    sending each data value of the sequential portion to a shift register out, wherein the shift register out transfers the data value to the target processor.

3. The method of claim 1, wherein saving a copy of an address further comprises:
    responsive to a signal that a previous transfer operation was successful, copying the address to another location in the FIFO buffer unit.

4. The method of claim 3, wherein resetting the read address counter further comprises:
    responsive to a signal that the transfer operation failed, copying the address from the another location to the read address counter.

5. The method of claim 1, wherein storing the plurality of data values further comprises:
    comparing a write address counter to the read address counter to determine whether the FIFO buffer unit is full.

6. The method of claim 1, wherein storing a plurality of data values further comprises:
    sending a signal to a processing unit providing the plurality of data values that the FIFO buffer is full when a difference between a write address counter and the read address counter reaches a first threshold; and
    sending a signal the processing unit that the FIFO buffer is almost empty when the difference reaches a second threshold.

7. A scan control unit for debugging a target processor, the scan control unit comprising:
    a processor configured to control transfer operations to transfer a plurality of data values to the target processor; and
    a first-in first-out (FIFO) buffer configured to store the plurality of data values at sequential addresses,
    wherein the scan control unit is configured to
        save a copy of an address in a read address counter of the FIFO buffer unit, wherein the address is that of an initial data value of a sequential portion of the plurality of data values;
        perform a transfer operation to send the sequential portion to the target processor, wherein the read address counter is incremented as each data value in the sequential portion is sent;
        reset the read address counter with the copy of the address if the transfer operation fails and perform the transfer operation again; and
        save a copy of an address in the read address counter if the transfer operation succeeds and perform another transfer operation to send a next sequential portion of the plurality of data values to the target processor.

8. The scan control unit of claim 7, wherein the scan control unit further comprises a shift register out configured to transfer data values to the target process, and wherein the FIFO buffer unit is configured to send each data value of the sequential portion to the shift register out.

9. The scan control unit of claim 7, wherein the FIFO buffer unit is configured to save the copy of the address by copying the address to another location in the FIFO buffer unit in response to a signal that a previous transfer operation was successful.

10. The scan control unit of claim 9, wherein the FIFO buffer unit is further configured to reset the read address counter by copying the address from the another location to the read address counter in response to a signal that the transfer operation failed.

11. The scan control unit of claim 7, wherein the FIFO buffer unit is further configured to compare a write address counter to the read address counter to determine whether the FIFO buffer unit is full.

12. The scan control unit of claim 7, wherein the FIFO buffer unit is further configured to:
    send a signal to a processing unit providing the plurality of data values that the FIFO buffer is full when a difference between a write address counter and the read address counter reaches a first threshold; and
    send a signal the processing unit providing the plurality of data values that the FIFO buffer is almost empty when the difference reaches a second threshold.

13. A test and debug system comprising:
    a target processor comprising a test access port; and
    a test and debug unit configured to transfer a plurality of data values to the target processor using the test access port, the test and debug unit comprising:
        a processor configured to provide the plurality of data values; and a scan control unit comprising a first-in first-out (FIFO) buffer unit, wherein the scan control unit is configured to:
- store the plurality of data values to be sent to the target processor at sequential addresses in the FIFO buffer unit;
- save a copy of an address in a read address counter of the FIFO buffer unit, wherein the address is that of an initial data value of a sequential portion of the plurality of data values;
- perform a transfer operation to send the sequential portion to the target processor, wherein the read address counter is incremented as each data value in the sequential portion is sent;
- reset the read address counter with the copy of the address if the transfer operation fails and perform the transfer operation again; and
- save a copy of an address in the read address counter if the transfer operation succeeds and perform another transfer operation to send a next sequential portion of the plurality of data values to the target processor.

14. The test and debug system of claim 13, wherein the FIFO buffer unit is configured to send each data value of the sequential portion to a shift register out, wherein the shift register out transfers the data value to the target processor.

15. The test and debug system of claim 13, wherein the FIFO buffer unit is configured to save the copy of the address by copying the address to another location in the FIFO buffer unit in response to a signal that the transfer operation was successful.

16. The test and debug system of claim 15, wherein the FIFO buffer unit is further configured to reset the read address counter by copying the address from the another location to the read address counter in response to a signal that the transfer operation failed.

17. The test and debug system of claim 13, wherein the FIFO buffer unit is further configured to compare a write address counter to the read address counter to determine whether the FIFO buffer unit is full.

18. The test and debug system of claim 13, wherein the FIFO buffer unit is further configured to:
- send a signal to the processing unit that the FIFO buffer is full when a difference between a write address counter and the read address counter reaches a first threshold; and
- send a signal the processing unit that the FIFO buffer is almost empty when the difference reaches a second threshold.

* * * * *